United States Patent [19]

Noda et al.

[11] Patent Number: 4,870,144

[45] Date of Patent: Sep. 26, 1989

[54] PROCESS FOR PRODUCING AN ISOBUTYLENE POLYMER HAVING FUNCTIONAL TERMINAL END GROUPS

[75] Inventors: Kouji Noda; Masayoshi Imanaka; Katsuhiko Isayama, all of Hyogo, Japan

[73] Assignee: Kanegafuchi Kagaku Kogyo Kabushiki Kaisha, Osaka, Japan

[21] Appl. No.: 159,038

[22] Filed: Feb. 19, 1988

[30] Foreign Application Priority Data

Feb. 20, 1987 [JP] Japan .................................. 62-38778

[51] Int. Cl.$^4$ .......................... C08F 2/06; C08F 4/14; C08F 10/10
[52] U.S. Cl. .................................. 526/216; 526/213; 526/220; 526/237; 526/348.7
[58] Field of Search ............ 526/237, 216, 217, 348.7, 526/213, 220

[56] References Cited

U.S. PATENT DOCUMENTS 4,568,732  2/1986  Kennedy et al. .................... 526/206
4,611,037  9/1986  Musch et al. ........................ 526/135

OTHER PUBLICATIONS

C. E. Schildknecht, Polymer Processes, Interscience Publishers, N.Y., (1956), p. 202.

*Primary Examiner*—Joseph L. Schofer
*Assistant Examiner*—F. M. Teskin
*Attorney, Agent, or Firm*—Armstrong, Nikaido, Marmelstein, Kubovcik & Murray

[57] ABSTRACT

Isobutylene polymers having functional terminal end groups are prepared by polymerizing a cationic polymerizable monomer containing isobutylene by using:

(A) as an initiator and chain transfer agent, an organic compound represented by the general formula (I):

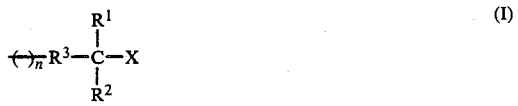

where X represents a halogen atom or RCOO— group (in which R represents a hydrogen atom or a monovalent organic group), $R^3$ represents a $(n+1)$-valent hydrocarbon group, $R^1$, $R^2$ represent respectively hydrogen atom or monovalent hydrocarbon group, $R^1$ and $R^2$ may be identical or different with each other, $R^1$ and $R^2$ are not hydrogen atom in a case while $R^3$ is an aliphatic hydrogen group, n is a positive integer;

(B) as a catalyst, a Lewis acid; and (C) as a solvent, a hydrocarbon or halogenated hydrocarbon containing an organonitro compound.

6 Claims, No Drawings

PROCESS FOR PRODUCING AN ISOBUTYLENE POLYMER HAVING FUNCTIONAL TERMINAL END GROUPS

FIELD OF THE INVENTION

The present invention concerns a process for producing an isobutylene polymer having a halogen atom or an RCOO— group, in which R is a hydrogen atom or monovalent organic group, at the terminal ends of the polymer chain. More specifically it relates to a process for producing an isobutylene polymer in which a halogen atom or an RCOO— group is introduced in a high yield at the terminal ends of the polymer chain during cationic polymerization of a cationic polymerizable monomer containing isobutylene, in the presence of a specific initiator and chain transfer agent and a catalyst, and wherein the polymerization is conducted in the presence of a specific mixed solvent.

BACKGROUND OF THE INVENTION

Polymers having functional end groups are well-known and are useful as starting materials for adhesives, coating materials, sealants, etc. Examples of such polymers include polyalkylene oxides having hydroxyl groups on both ends of the polymer chain, which are referred to as telechelic polymers, used to prepare polyurethanes.

Isobutylene polymers having functional end groups can be produced by the INIFER process, in which isobutylene is cationically polymerized using a halogenated compound, such as 1,4-bis(α-chloroisopropyl)benzene (hereinafter referred to as p-DCC), as an initiator and chain transfer agent and a Lewis acid such as $BCl_3$, as a catalyst. That process is described in U.S. Pat. No. 4,276,394 specification of which is incorporated therein by reference.

Isobutylene polymers having chlorine atoms at both ends of the polymer chain obtained by the INIFER process can easily be converted by dehydrochlorination into a polymer having isopropenyl groups at both ends. The polymer having isopropenyl groups can be readily converted by hydroboration to polymers having hydroxyl groups bonded to the primary carbon at each end of the polymer chain.

However, in the polymerization of isobutylene by the INIFER process, as described above, there is a problem that side-reactions tend to occur and considerable amounts of polymers having various kinds of end groups (such as

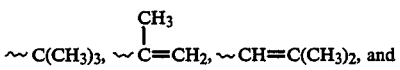

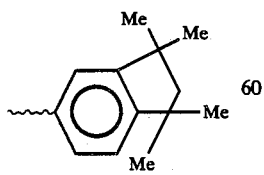

(indanyl group),etc.) are produced, in addition to the desired chlorine-containing ( $\sim C(CH_3)_2Cl$ ) end group. These side reaction can occur under very mild conditions, even when the polymerization temperature is as low as from $-50°$ to $-70°$ C., and the monomer concentration is as dilute as about 1M.

SUMMARY OF THE INVENTION

A primary object of the present invention is to provide a process for producing a polymer in which functional groups, such as halogen atoms, are introduced in a high yield to the ends of the polymer chain prepared using the INIFER process for the cationic polymerization of isobutylene.

The foregoing object can be attained in accordance with the present invention by a process for producing an isobutylene polymer having functional end groups from cationic polymerizable monomers containing isobutylene by using:

(A) as an initiator and chain transfer agent, an organic compound represented by the general formula (I):

wherein the symbol $(\text{---})_n$ designates n-valent bonds meaning that $R^3$ can optionally contain 1 to 5 substituents in addition to the $-CR^1R^2X$ substituent; wherein X represents a halogen atom or an RCOO— group (R represents a hydrogen atom or a monovalent organic group), $R^3$ represents a (n+1)-valent hydrocarbon group, $R^1$ and $R^2$ are a hydrogen atom or a monovalent hydrocarbon group, $R^1$ and $R^2$ are taken individually and may be identical or different, but they are not simultaneously a hydrogen atom if $R^3$ is an aliphatic hydrocarbon group, and (B) as a catalyst, a Lewis acid, and (C) as a solvent, a hydrocarbon or halogenated hydrocarbon containing an organic compound, thereby producing an isobutylene polymer having halogen atoms or RCOO- groups in which R has the same meaning as above, at its terminal ends.

The group of formula (I) may be illustrated as

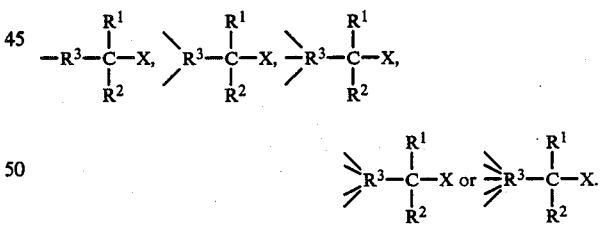

According to the process of the present invention, polymers can be obtained in which functional groups, such as halogen atoms, are introduced in high yield at the terminal ends of the polymer chain.

DETAILED DESCRIPTION OF THE INVENTION

The cationic polymerizable monomer containing isobutylene usable in the present invention is a monomer consisting solely of isobutylene or a mixture of isobutylene and a cationic polymerizable monomer copolymerizable with isobutylene. In the case of using the mixture, mixtures containing not less than 50% (by weight, and hereinafter referred to as the same) of butylene in the total monomer is preferred.

The cationic polymerizable monomer copolymerizable with isobutylene preferably includes those compounds having ethylenically unsaturated bonds with 3 to 12 carbon atoms and can include, for example, olefins, with 3 to 12 carbon atoms conjugated dienes, vinyl ethers, aromatic vinyl compounds, vinyl silanes or allyl silanes. Among them, olefins or conjugated dienes with 3 to 12 carbon atoms are preferred.

Specific examples of the cationic polymerizable monomer copolymerizable with isobutylene include, for example, propylene, 1-butene, 2-butene, 2-methyl-1-butene, 3-methyl-1-butene, pentene, 4-methyl-1-pentene, hexene, vinyl cyclohexane, butadiene, isoprene, cyclopentadiene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinylmethoxysilane, divinyldimehtylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyl trimethoxysilane, γ-methaccyloyloxypropyl methyldimethoxysilane, etc. Among them, preferred are, for example, propylene, 1-butene, 2-butene, styrene, butadiene, isoprene, cyclopentadiene, etc. These cationic polymerizable monomers copolymerizable with isobutylene can be used alone or two or more of them be used together in combination with isobutylene.

In the present invention, the organic compound having the group represented by the general formula (I) is used as the initiator and as the chain transfer agent. In the case where $R^1$, $R^2$ represent monovalent hydrocarbon groups in the general formula (I), it is preferred that they are hydrocarbon groups with 1 to 20 carbon atoms. Some of the hydrogen atoms in the hydrocarbon groups may partially be replaced by other substituents. Among the hydrocarbon groups, aliphatic hydrocarbon groups with 1 to 12 carbon atoms, such as methyl or ethyl group, are preferred. If both $R^1$, $R^2$ are hydrogen atoms where $R^3$ is an aliphatic hydrocarbon group, stable carbonium ions are not formed and polymerization does not progress smoothly.

In the general formula (I), $R^3$ is preferably a hydrocarbon group with 1 to 40 carbon atoms. Some of the hydrogen atoms in the hydrocarbon group may be replaced by other substituents. $R^3$ may be an aromatic hydrocarbon group or aliphatic hydrocarbon group. Examples of $R^3$ can include:

in which n is an integer of 1 to 5, m is an integer of 1 to 10 and $(-)_{n+1}$ is as defined above.

In the general formula (I), n is an integer of 1 to 5, and, more preferably, 1 or 2. X represents a halogen atom or an RCOO— group. Examples of the halogen atom can include, for example, fluorine, chlorine, bromine and iodine, with chlorine or bromine being preferred. In the RCOO— group, R is preferably a hydrogen atom or a hydrocarbon group with 1 to 6 carbon atoms and, particularly, an aliphatic hydrocarbon group. Examples of the RCOO— group include, for example, $CH_3COO-$ and $C_2H_5COO-$.

Examples of the organic compound having the group represented by the general formula (I) includes those compounds represented by the general formula (II):

where A represents a group having 1 to 4 aromatic rings, Y is a group represented by the general formula (III), attached to the aromatic ring:

where $R^4$ and $R^5$ individually represent a hydrogen atom or a monovalent hydrocarbon group with 1 to 20 carbon atoms, X is a halogen atom or an RCOO— group and l represents an integer of 1 to 6; and a compound represented by the general formula (IV):

wherein $B^1$ represents a hydrocarbon group with 4 to 40 carbon atoms, Z represents a halogen atom or an RCOO— group (R has the same meaning as described above) attached to a tertiary carbon atom, and k represents an integer of 1 to 4; and oligomers having α-halostyrene units. These compounds may be used alone, or two or more of them may be used in combination.

The moiety A which is the group having 1 to 4 aromatic rings in the compound represented by the general formula (II) may be prepared by known procedures, for example, by condensation. Specific examples of such aromatic ring-containing groups include, for example, 1-to 6- valent phenyl, biphenyl, naphthalene, anthracene, phenanthrene, pyrene, ph-$(CH_2)_j$-ph (where j is an integer from 1 to 10) etc. These groups having aromatic rings may be substituted with aliphatic hydrocarbon groups with 1 to 20 hydrocarbons, or those groups having functional groups such as hydroxy, ether and vinyl.

When, on the other hand, the moiety Z in the compound represented by the general formula (IV) is a halogen atom or an RCOO— group attached to the tertiary carbon atom, the moiety B in the general formula (IV) is a hydrocarbon with 4 to 40 carbon atom and, preferably, aliphatic hydrocarbon group. If the number of carbon atoms is less than 4, a hydrogen atom or an RCOO— group does not remain bound to the tertiary carbon atom, and such compounds are not suitable for use.

The oligomer containing α-halostyrene units that can be used as the initiator and chain transfer agent can include, for example, an oligomer of α-chlorostyrene or an oligomer prepared by copolymerizing α-chlorostyrene and a monomer copolymerizable therewith.

When a compound having two or more halogen atoms or RCOO— group is used as the initiator and chain transfer agent in the process according to the present invention, a polymer having functionality on both terminal ends, i.e., so-called telechelic polymer can be obtained. Such polymer is extremely useful.

Specific examples of the initiator and chain transfer agent as described above can include, for example,

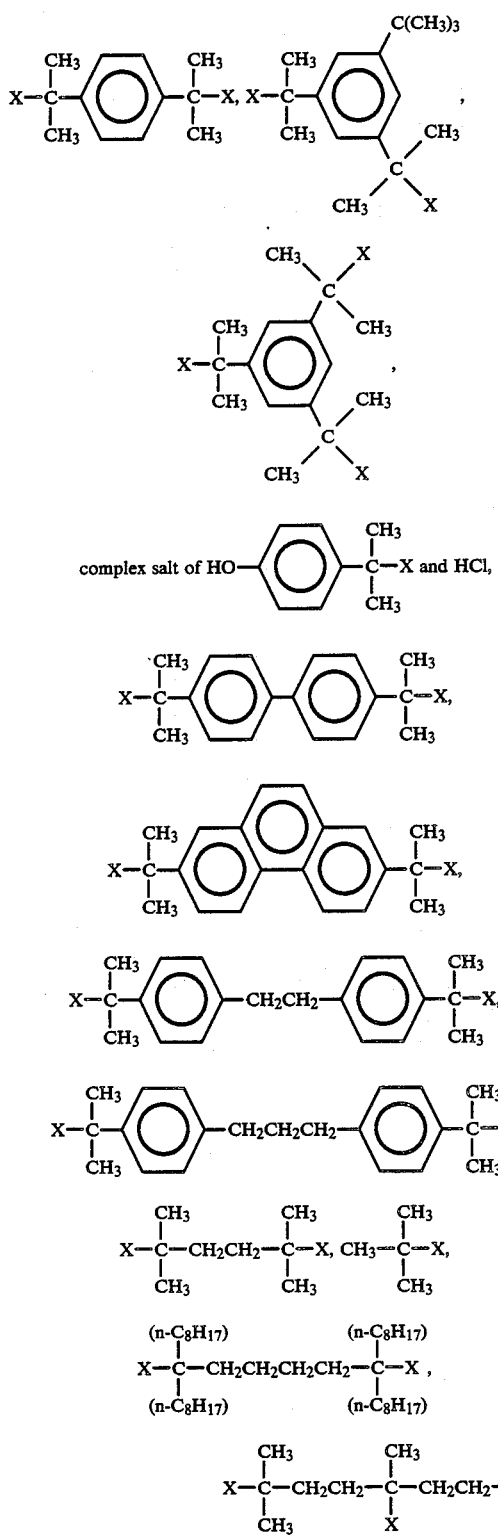

organic compounds containing halogen atoms such as oligomers of α-chlorostyrene or organic compounds containing RCOO— groups. Those preferred among these compounds can include halogen atom-containing organic compounds having —C(CH₃)₂Cl or —C(CH₃)₂Br capable of forming stable carbonium cations, for example,

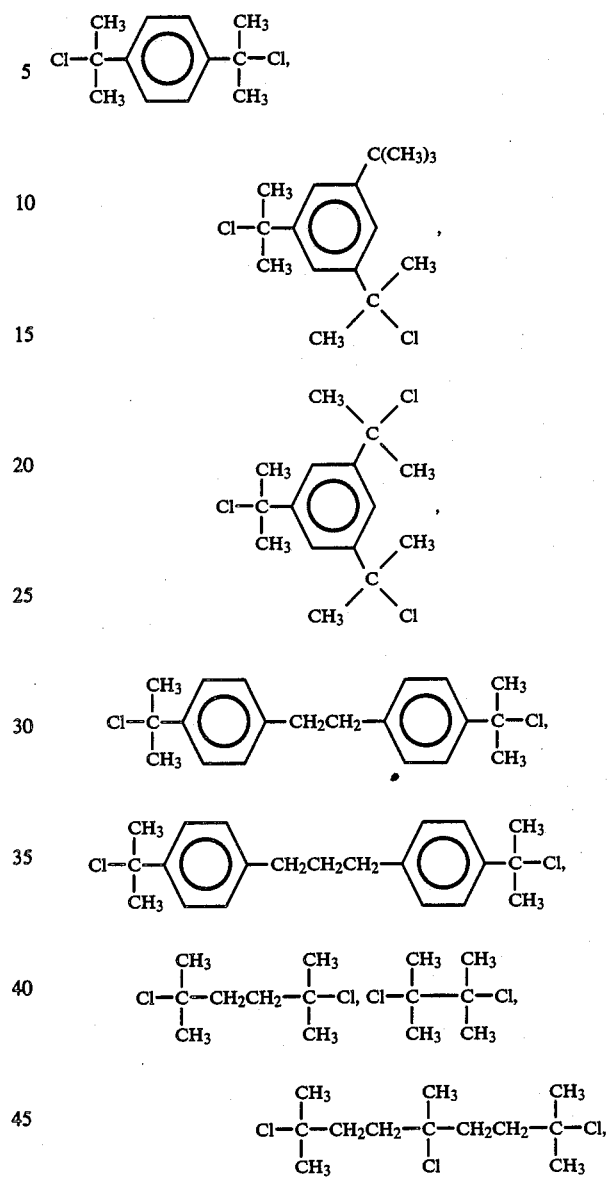

and those compounds in which chlorine atoms are replaced with bromine atoms in the above compounds such as

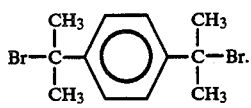

Further, compounds containing CH₃COO— group, such as

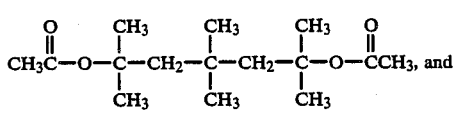

-continued

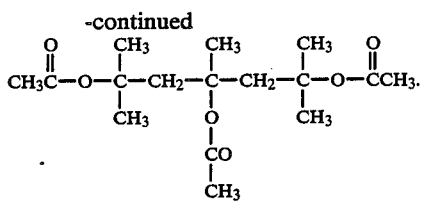

are also preferred.

These compounds are the ingredient used as the initiator and as the chain transfer agent and the molecular weight of the polymer can be controlled by the amount used, usually about from 0.01 to 20% by weight and, preferably, from 0.1 to 10% by weight relative to the cationic polymerizable monomer containing isobutylene.

The Lewis acid used in the present invention is the ingredient used as the catalyst. Typical examples of Lewis acids include those compounds represented by MX'n' (in which M represents a metal atom, X' represents a halogen atom and n' represents a positive integer). Examples of MX'n' can include, for example, $BCl_3$, $AlCl_3$, $SmCl_4$, $TiCl_4$, $VCl_5$, $FeCl_3$ and $BF_3$. Among them, $BCl_3$, $AlCl_3$, $BF_3$, etc. are preferred, with $BCl_3$ being particularly preferred.

The amount of the Lewis acid is, preferably, from 0.1 to 10 moles and, more preferably, from 2 to 5 moles per mol of the initiator and the chain transfer agent utilized.

In the process of the present invention, a hydrocarbon or a halogenated hydrocarbon containing an organonitro compound is used as the polymerization solvent. Between the hydrocarbon and halogenated hydrocarbon, halogenated hydrocarbons are preferred and, chlorinated hydrocarbons having one or two chlorine atoms are particularly preferred.

Specific examples of the hydrocarbon and halogenated hydrocarbon can include, for example, pentane, hexane, $CH_3Cl$, $CH_3CH_2Cl$, $CH_2Cl_2$, $CH_3CH_2Cl$, $CH_2ClCH_2Cl$, etc. They may be used alone or as a mixture and, further, may be used together with a small amount of other solvent.

Specific examples of the organonitro compound contained in the hydrocarbon or halogenated hydrocarbon can include, for example, $CH_3NO_2$, $CH_3CH_2NO_2$, 1-nitropropane, 2-nitropropane, nitrobenzene, etc., and they may be used in admixture. Among the organonitro compounds those nitrohydrocarbons having one or two nitro groups are preferred.

The ratio of using one or more of the organonitro compound and one or more of the hydrocarbon or halogenated hydrocarbon as the main solvent is preferably from 0.1 to 100 parts by weights, more preferably, from 0.5 to 20 parts by weight of the organonitro compound based on 100 parts of one or more of the hydrocarbon or halogenated hydrocarbon.

The polymerization method, may be batchwise charging solvent, monomer, initiator and chain transfer agent, catalyst, etc. successively into a vessel, or a continuous method of solvent, monomer, initiator and chain transfer agent, catalyst, etc. continuously charged into and taken out of a vessel.

The polymerization temperature is, preferably from $-10°$ to $-120°$ C. and, more preferably from $-20°$ to $-80°$ C. The polymerization time is preferably from 0.5 to 80 min and more preferably, from 1 to 30 min.

The monomer concentration upon polymerization is, preferably, about from 0.1 to 8M and, more preferably, about from 0.5 to 5M.

The organonitro compounds may be added directly to the main solvent, or added to the solution of the initiator and chain transfer agent or added to the catalyst solution. Further, a catalyst solution prepared from the organonitro compound and the catalyst may be added, and these methods can be employed in combination.

The polymerization is preferably stopped by the addition of alcohols such as methanol.

The present invention is hereinafter described in greater detail with reference to examples, which are not to be constructed as limiting the scope thereof.

EXAMPLE 1

A stirring blade, a three-way stopcock and a vacuum line were attached to a 1 liter autoclave made of pressure-proof glass and, while evacuating through the vacuum line, the polymerization vessel was dried by heating at 100° C. for one hour and, after cooling to the room temperature, the pressure was returned to the normal pressure by opening the three-way stopcock.

Then, while introducing nitrogen from one end of the three-way stopcock, 290 ml of methylene chloride, i.e., a main solvent dried by treatment with calcium hydride was introduced into an autoclave using an injection cylinder. Then, 15 ml of nitromethane dried by treatment with calcium chloride was introduced and, further, 10 ml of methylene chloride solution containing 10 mmol of p-DCC (1,1-bis(α-chloroisopropyl)benzene) dissolved therein was added.

Then, after connecting, to the three-way stopcock, a liquefied gas sampling tube made of pressure-proof glass attached with a needle valve and containing 40 g of isobutylene dehydrated by passing through a column packed with barium oxide, the polymerization vessel was immersed in a dry ice-acetone bath $-70°$ C. and cooled for one hour while stirring its contents. After cooling, the pressure of the inside was reduced via the vacuum line, the needle valve was opened and isobutylene was introduced from the liquefied gas sampling tube made of pressure-proof glass into the polymerization vessel. Then, the pressure was returned to normal pressure by introducing nitrogen from one end of the three-way stopcock and the contents of the polymerization vessel were cooled to $-60°$ C. by continuing the cooling for one hour under stirring.

Then, a boron trichloride solution (containing 20 mmol of boron trichloride) was added from the three-way stopcock by an injection cylinder to start the polymerization and, after the elapse of 30 min, methanol previously cooled to lower than $-40°$ C. was added to stop the polymerization.

The temperature of the polymerization vessel was returned to the room temperature and the reaction mixture was taken out into a eggplant-shaped flask to remove unreacted isobutylene, methylene chloride, nitromethane and methanol by distillation. After dissolving the residual polymer in 400 ml of n-hexane, the solution was repeatedly washed with water till it became neutral. Then, the n-hexane solution was concentrated to 80 ml and the concentrated solution poured into a one liter of acetone to settle and separate the polymer.

The thus obtained polymer was again dissolved into 400 ml of n-hexane, dried over anhydrous magnesium sulfate, and filtered to removed n-hexane under a reduced pressure to obtain the purified isobutylene polymer.

The yield was calculated from the amount of the resultant polymer produced, $\overline{Mn}$ and $\overline{Mw}/\overline{Mn}$ were determined by GPC, and the end structure was determined by measuring and comparing the intensity of proton resonance signals belonging to each of the structures by the $H^1$-NMR (300 MHz) method. The results are shown in Table 1.

EXAMPLES 2–4

Polymers were produced and evaluated in the same manner as in Example 1 excepting for changing the kind and the amount of the organonitro compound as shown in Table 1. The results are shown in Table 1.

EXAMPLES 5–11

Polymers were produced and evaluated in the same manner as in Example 1 excepting for using 1,1-dichloroethane instead of methylene chloride as the main solvent and changing the kind and the amount of the organonitro compound as shown in Table 2. The results are shown in Table 2.

COMPARATIVE EXAMPLE 1

Polymer was produced and evaluated in the same manner as in Example 1 excepting for not using the organonitro compound. The results are shown in Table 1.

COMPARATIVE EXAMPLE 2

Polymer was produced in the same manner and evaluated as in Example 5 excepting for not using the organonitro compound. The results are shown in Table 2.

TABLE 1

| | Organic compound having nitro group Kind | Amount (ml) | Yield | Number average Molecular weight ($\overline{Mn}$) | molecular weight distribution ($\overline{Mw}/\overline{Mn}$) | Amount of functional group* $-\underset{CH_3}{\underset{|}{\overset{CH_3}{\overset{|}{C}}}}-Cl$ group | Olefin group** | Indanyl |
|---|---|---|---|---|---|---|---|---|
| Example 1 | $CH_3NO_2$ | 15 | 80 | 4700 | 1.8 | 1.9 | 0 | 0.1 |
| Example 2 | $C_2H_5NO_2$ | 15 | 85 | 4500 | 1.6 | 2.0 | 0 | 0 |
| Example 3 | 2-nitropropane | 15 | 85 | 4800 | 1.5 | 2.0 | 0 | 0 |
| Example 4 | Nitrobenzene | 15 | 60 | 5500 | 1.8 | 1.8 | 0.1 | 0.1 |
| Comparative Example 1 | — | — | 80 | 9000 | 3.0 | 1.1 | 0.5 | 0.3 |

*number per one polymer molecule

**Olefin group means $-\underset{CH_3}{\overset{|}{C}}=CH_2$ and $-\overset{H}{\underset{}{\overset{|}{C}}}=\underset{CH_3}{\overset{|}{C}}-CH_3$

TABLE 2

| | Organic compound having nitro group Kind | Amount (ml) | Yield | Number average Molecular weight ($\overline{Mn}$) | molecular weight distribution ($\overline{Mw}/\overline{Mn}$) | Amount of functional group* $-\underset{CH_3}{\underset{|}{\overset{CH_3}{\overset{|}{C}}}}-Cl$ group | Olefin group** | Indanyl |
|---|---|---|---|---|---|---|---|---|
| Example 5 | $CH_3NO_2$ | 15 | 70 | 4700 | 1.5 | 1.7 | 0.1 | 0.2 |
| Example 6 | $C_2H_5NO_2$ | 15 | 75 | 5900 | 1.8 | 1.9 | 0 | 0.1 |
| Example 7 | $C_2H_5NO_2$ | 10 | 80 | 5300 | 1.5 | 2.0 | 0 | 0 |
| Example 8 | $C_2H_5NO_2$ | 5 | 90 | 5500 | 1.6 | 1.9 | 0 | 0.1 |
| Example 9 | 1-nitropropane | 15 | 85 | 5800 | 2.0 | 2.0 | 0 | 0 |
| Example 10 | 2-nitropropane | 15 | 80 | 5800 | 1.8 | 2.0 | 0 | 0 |
| Example 11 | Nitrobenzene | 15 | 50 | 6000 | 1.9 | 1.9 | 0.1 | 0 |
| Comparative Example 2 | — | — | 85 | 5000 | 2.8 | 1.2 | 0.3 | 0.4 |

*number per one polymer molecule

**Olefin group means $-\underset{CH_3}{\overset{|}{C}}=CH_2$ and $-\overset{H}{\underset{}{\overset{|}{C}}}=\underset{CH_3}{\overset{|}{C}}-CH_3$ As apparent from the results of Table 1 and 2, when polymerization is conducted without using the organonitro compound (Comparative Examples 1, 2), it can be seen that a large amount of

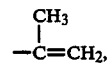

$-CH=C(CH_3)_2$ and indanyl groups are present, in addition to the desired $-C(CH_3)_2Cl$ group at the terminal ends of the polymer obtained.

On the other hand, when the polymer having functional terminal end groups is produced by the process according to the present invention, it can be seen that a polymer having the desired —C(CH$_3$)$_2$Cl group at high ratio in the terminal ends is obtained in good yields. Side-reactions are suppressed and the molecular weight distribution becomes sharp.

While the invention has been described in detail and with reference to specific embodiments thereof, it will be apparent to one skilled in the art that various changes and modifications can be made therein without departing from the spirit and scope thereof.

What is claimed is:

1. A process for producing an isobutylene polymer having a functional terminal end group, which comprises polymerizing at least one cationic polymerizable monomer containing isobutylene by using:
   (A) as initiator and chain transfer agent, an organic compound selected from the group consisting of a compound of the formula AY$_l$ wherein A is a group having 1 to 4 aromatic rings, Y is a group of the formula

attached to an aromatic ring of A, wherein R$^4$ and R$^5$ taken individually are a hydrogen atom or a monovalent hydrocarbon group with 1 to 10 carbon atoms; X is a halogen atom or a RCOO-group, wherein R is a hydrogen atom or a hydrocarbon group having 1 to 6 carbon atoms and l is an integer of 1 to 6;

a compound of the formula

B$^1$Z$k$ wherein B$^1$ is a hydrocarbon group with 4 to 40 carbon atoms, Z is a halogen atom or a RCOO-group, wherein R is defined as above, attached to a tertiary carbon atom, and k is an integer of 1 to 4; and oligomers having α-halostryene units;

(B) as a catalyst, a Lewis acid; and
   (C) as a solvent, a hydrocarbon or halogenated hydrocarbon containing a nitrochydrocarbon having one or two nitro groups.

2. A process according to claim 1, wherein the organic compound is AY$_l$.

3. A process according to claim 1, wherein the organic compound is B$^1$Zk.

4. A process according to claim 1, wherein the organic compound is an oligomer comprising α-halostyrene unit.

5. A process according to claim 1, wherein the solvent is a chlorinated hydrocarbon having one or two chlorine atoms and a nitrohydrocarbon having one or two nitro groups.

6. A process according to claim 5, wherein the solvent contains 0.1 to 100 parts by weight of the nitrohydrocarbon per 100 parts of the chlorinated hydrocarbon.

* * * * *